Feb. 14, 1956  W. J. F. FORWARD ET AL  2,734,256
CUTTING TOOL
Filed Feb. 9, 1953  2 Sheets-Sheet 1
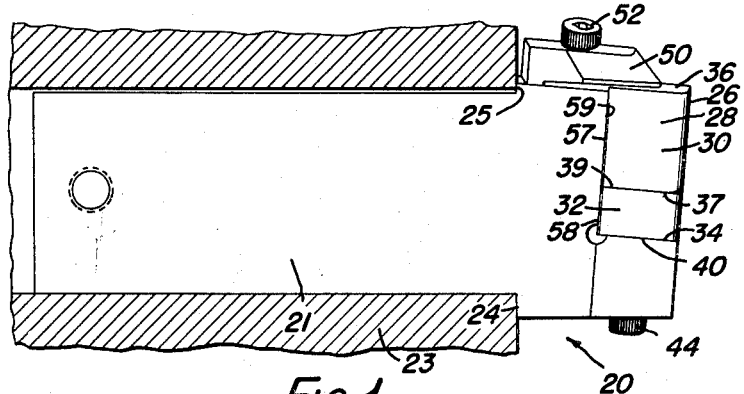
Fig.1.
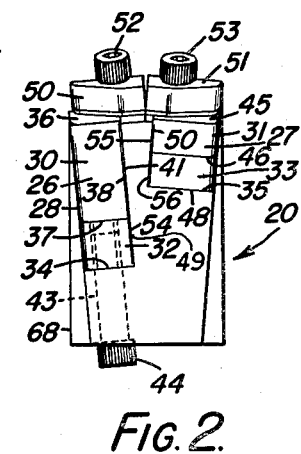
Fig.2.
Fig.3.
Fig.4.
Fig.5.
Fig.6.
INVENTOR.
WORTHY J. F. FORWARD
WILLIAM R. MILLER, JR.
BY
ATTORNEY Feb. 14, 1956  W. J. F. FORWARD ET AL  2,734,256
CUTTING TOOL Filed Feb. 9, 1953  2 Sheets-Sheet 2

INVENTOR.
WORTHY J. F. FORWARD
WILLIAM R. MILLER, JR.
BY
ATTORNEY

United States Patent Office 2,734,256
Patented Feb. 14, 1956

2,734,256
CUTTING TOOL

Worthy J. F. Forward, Rochester, and William R. Miller, Jr., Brighton, N. Y., assignors, by mesne assignments, to Farrel-Birmingham Company, Incorporated, Ansonia, Conn., a corporation of Connecticut Application February 9, 1953, Serial No. 335,862

8 Claims. (Cl. 29—96)

The present invention relates to cutting tools particularly for lathes, boring mills, and similar machines. In a more specific aspect, the invention relates to cutting tools which have inserted cutting bits made of a hard, high-speed cutting material such as tungsten carbide.

Tungsten carbide and similar materials are extremely hard and have the ability to cut metals at high speed. They are, however, brittle. It is therefore, the practice to mount the tungsten carbide or other cutting bits in tool holders made of a less costly metal and that have sufficient resilience and strength as not to be subject to breakage in use under normal conditions.

It has heretofore been the practice, in the case of lathe tools, boring tools, and the like, to secure the high-speed tool bit in a pocket in a shank-type tool holder, and to adjust the bit for wear, after sharpening, by adjustment of a screw that is rotatably mounted in the holder and threads into the bit. Because of the brittleness of the high-speed cutting material, however, it frequently happens that the bit snaps under cutting pressure where it is weakest, namely, in a plane passing through its threaded bore portion. When the cutting bit breaks there is, aside from the loss of the broken bit, the expense of the time of shutting down the lathe, or boring mill, or other machine tool, to replace the cutting tool.

A primary object of the present invention is to provide a cutting tool of the type using a removable cutting bit, in which the cutting bit will be less subject to breakage in use.

A concomitant object of the invention is to provide a cutting tool having an inserted cutting bit in which the cutting bit is solid, and has no adjusting threads through it, but can nevertheless be adjusted to compensate for wear, after sharpening.

A further object of the invention is to provide a cutting tool of the type described in which the cutting bit is so mounted that when it is adjusted after sharpening the cutting edge of the tool is restored to its initial position so that the position of the cutting edge of the cutting bit can remain constant throughout the life of the bit.

Another object of the invention is to provide a cutting tool of the type described which is so constructed that the cutting bit may be provided initially with a cutting contour of any desired shape and that contour thereafter does not have to be ground or reground at any time during the life of the bit, the adjustment of the bit in the tool holder serving of itself to restore the cutting edge of the bit to its original position and no change in the cutting contour of the bit being required at any time during the life of the tool.

Other objects of the invention will be apparent hereinafter from the specification and from the recital of the appended claims.

In the drawings:

Fig. 1 is a side elevation of a car wheel contouring tool made according to one embodiment of this invention, and showing in section how this tool may be mounted in a lathe or other machine tool;

Fig. 2 is an end view of this tool;

Fig. 3 is a plan view of this tool showing again in section how it may be mounted in a lathe;

Fig. 4 is a fragmentary side elevation of a car wheel flange topping tool constructed according to one embodiment of this invention;

Fig. 5 is an end view of this flange topping tool;

Fig. 6 is a plan view of this tool;

Figure 7:
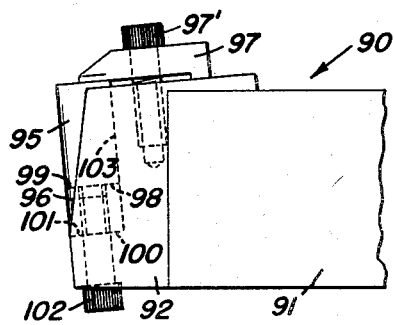
Fig. 7 is a fragmentary side elevation of a burring tool constructed according to one embodiment of this invention.

The tools illustrated in the drawings are tools such as may be employed in a car wheel lathe, where they may be used for contouring, topping and burring a car wheel that is to be reconditioned.

Referring first to the embodiment of the invention illustrated in Figs. 1 to 3 inclusive, 20 denotes the tool holder itself. The tool holder 20 has a shank portion 21 which is adapted to be mounted in the shank-receiving pocket 22 of the tool-carrying turret 23 of the car wheel lathe. It has shoulders 24 and 25 seating against the outer face of the turret; and it has two bit-receiving pockets formed therein that are open at their fronts, tops and outsides.

The pockets of the tool holder 20 are adapted to hold two high-speed cutting bits 30 and 31, respectively, which may be made of tungsten carbide or other high-speed cutting metal. The cutting bits are adapted to seat against seat plates 32 and 33, respectively, which, when the cutting bits are new, seat directly against the bottom walls 34 and 35 of the two pockets in the tool holder. The seats 34 and 35 are plane surfaces and in the embodiment of the invention shown in Figs. 1 to 3 inclusive are inclined to one another for the purpose of properly positioning the two separate cutting bits in their respective cutting positions.

Each of the cutting bits 30 and 31 (Figs. 1 to 3, 11 and 14) is a solid piece of cutting material which is generally prismatic in shape. The two cutting bits differ only in size. Both are ground on their top and bottom faces precisely to have plane parallel front and rear faces; and both are preferably ground on their inside faces and on their rear faces, also, to have plane faces perpendicular to said top and bottom faces. The front and outside faces of the bits may be formed to any desired shapes, but are preferably tangent to planes perpendicular to the bottom faces of the bits. In the drawings they are shown as plane and joined by a connecting round. The front faces of the two bits are denoted at 26 and 27; and the outside faces of the bits are designated 28 and 29, respectively (Figs. 1, 2 and 3). The top faces of the bits are indicated at 36 and 45 in Figs. 1, 2, 11 and 14. The inside faces of the bits are denoted at 41 and 55, respectively, in Fig.

2. The rear face of the tool bit 30 is shown at 57 in Fig. 1.

Figure 12:
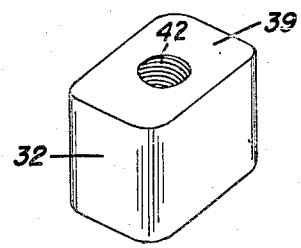
Fig. 12 is a perspective view of the seating plate used with this cutting bit.

The seating plate 32 used with the tool bit 30 is shown on a larger scale in Fig. 12. It may be made of carbon tool steel, or other suitable material and is precisely ground on its top and bottom faces 39 and 40, respectively (Figs. 12 and 1) to have plane surfaces seating accurately against the bottom face of the cutting bit 30 and against the bottom wall 34 of the tool holder pocket, respectively. It is also ground on its inside face 49 (Fig. 2) and on its rear face 58 (Fig. 1), its inside, rear and bottom faces being plane surfaces perpendicular to one another, and its top face being parallel to its bottom face. It is threaded, as indicated at 42, to receive the adjusting screw 43 whereby it may be clamped in adjusted position to compensate for wear of the tool bit 30 after sharpening. The screw 43 is journaled in the tool holder 20 and has a knurled head 44 by which it may be grasped and rotated for adjustment.

The inside surfaces 41 and 49 of the tool bit 30 and seating plate 32, respectively, are adapted to seat against the inside surface 38 of the pocket in the tool holder 20 whose bottom wall is denoted at 34; and the rear surfaces 57 and 58 of the cutting bit and seating plate, respectively, seat against the rear wall 59 of this pocket.

Figure 15:
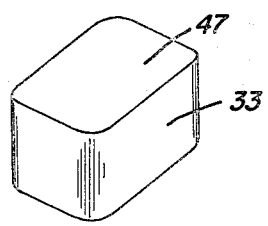
Fig. 15 is a perspective view of the seating plate used with the cutting bit of Fig. 14.

The tool bit 31 is ground to have plane top and bottom faces 45 and 46, respectively. The surface 46 seats against a plane surface 47 (Fig. 15) on the seating plate 33. The seating plate is ground with top and bottom parallel plane faces 47 and 48 (Fig. 2). The surface 48 seats, when the tool bit is new, directly upon the bottom wall 35 of the other pocket of the tool holder. The tool bit 31 and seating plate 33 have inside surfaces 55 and 56 (Fig. 2), respectively, which are ground as plane surfaces perpendicular to surfaces 46 and 47; and they also have plane rear surfaces perpendicular to their inside surfaces and to surfaces 46 and 47. The inside surfaces 55 and 56 of bit 31 and seating plate 33 seat against the inside wall 50 (Fig. 2) of the pocket whose bottom wall is denoted at 35 and the rear surfaces of the bit and seating plate seat against the rear surface (not shown) of this pocket.

The two tool bits are clamped in the tool holder by clamping plates 50 and 51, respectively, which fulcrum on the holder and which are secured in place by knurled-headed screws 52 and 53, respectively, which thread into the tool holder.

Figure 9:
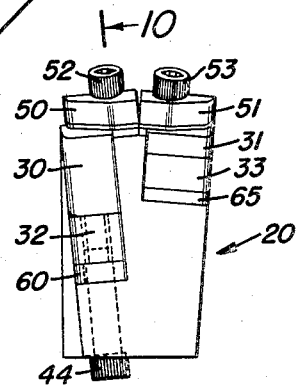
Fig. 9 is an end view of the contouring tool, similar to Fig. 2, but showing the bit adjusted after sharpening and showing a shim mounted in the tool to compensate for the amount of stock taken off the bit in sharpening.
Figure 10:
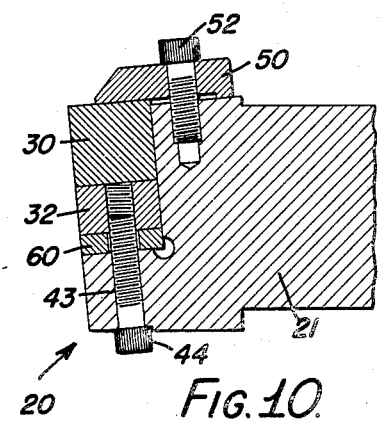
Fig. 10 is a section through the tool on the line 10—10 of Fig. 9.
Figure 11:
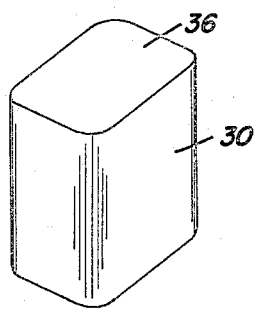
Fig. 11 is a perspective view of one of the cutting bits used in the tool holder of Fig. 9.
Figure 13:
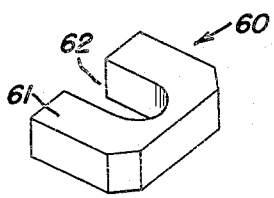
Fig. 13 is a perspective view of the shim used with this seating plate.
Figure 14:
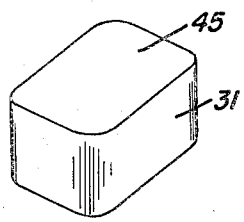
Fig. 14 is a perspective view of the other cutting bit of Fig. 9.
Figure 16:
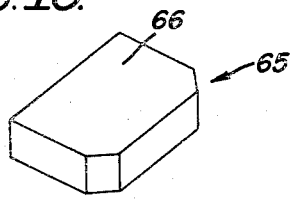
Fig. 16 is a perspective view of a shim such as may be used with the seating plate of Fig. 15.

Because the tool bits 30 and 31 are solid chunks of material they are not as liable to breakage as tool bits that are threaded for adjustment. In the case of the tool bit 30, the adjustment is secured by adjusting the seating plate 32. In the case of the tool bit 31 adjustment is obtained by inserting shims between the bottom wall 35 of the tool holder and the bottom face 48 of the seating plate 33. A shim, such as is employed when the tool bit 30 is adjusted, is shown at 60 in Fig. 13. This shim has plane parallel top and bottom faces, the top face being denoted at 61. The shim 60 is of horseshoe shape, having a slot 62 in it to fit around the shank portion of the adjusting screw 43, as shown in Figs. 9 and 10. A shim, such as may be used in connection with adjustment of the tool bit 31, is shown at 65 in Fig. 16. This shim also has plane ground top and bottom faces, the top surface being denoted at 66. A plurality of seating plates 33 of different thicknesses and a plurality of shims 65 of different thicknesses may be provided so as to secure accurate adjustment of the tool bit 31 in the tool holder.

It will be noted that the inside surface 38 of the pocket, that holds bit 30, is inclined to the side 68 (Fig. 2) of the shank of the tool. Because of this inclination, when the cutting bit 30 is positioned in the pocket, its outside face 28 is inclined to the side cutting plane of the tool and has cutting clearance back of its outside cutting edge. Similarly the rear face 57 of the pocket, that holds bit 30, is inclined rearwardly back of the top of the pocket; and because of this inclination, when the tool bit is positioned in the pocket, its front surface 26 is inclined to the front cutting plane of the tool and has cutting clearance back of its front cutting edge. Because of the inclination of the surfaces 38 and 57, also, the tool bit 30 can be adjusted in its pocket in a direction perpendicular to its bottom face 37, after sharpening, to bring its new cutting edges into the positions occupied by its previous cutting edges and the new cutting edges will still have the same relief or cutting clearance as the previous cutting edges. Because of this, also, the surfaces 26 and 28 of the bit 30 can be formed initially to any desired shapes and those shapes will be maintained throughout the whole life of the bit. The cutting contour of the bit remains constant throughout its whole life and needs no grinding or re-grinding.

In similar manner the inside and rear surfaces of the pocket, which holds cutting bit 31 insure the desired relief or cutting clearance for the outside and front cutting edges of that bit when that bit is positioned in its pocket. These surfaces also insure correct positioning of the new cutting edges of the bit after sharpening and insure maintenance of the cutting contour of the bit throughout its life.

The form of the bit-carrying pockets, therefore, enable simple, inexpensive bits to be used in tools made according to the present invention and keeps sharpening and maintenance costs to a minimum.

The flange topping tool of Figs. 4, 5 and 6 comprises a tool holder 70 which has a shank portion 71 adapted to be mounted in the turret of the machine. The shank portion has a head 72 formed with a pocket having a plane inside wall 73 and a plane bottom wall 74, and a plane rear wall 69. The walls 73, 74 and 69 are perpendicular to one another, but walls 73, 74 and 69 are inclined to the side, top, and front faces, respectively, of the shank 71 of the tool holder so that when the cutting bit is mounted in the tool holder its cutting edges will have cutting clearance.

The tool holder 70 is adapted to carry a tool bit 75, which like the tool bits in the previously described embodiment of the invention, is solid, and generally prismatic in shape. The tool bit 75 has a top face 76 and a bottom face 77. Bottom face 77 is plane and is adapted to seat against a seating plate 78 which has a plane top face 79 and a parallel plane bottom face 83. The plane bottom face 83 and the plane top face 79 are adapted to seat against the bottom wall 74 of the pocket in the tool holder and the plane bottom surface 77 of the tool bit, respectively.

The tool bit 75 is clamped in the tool holder 70 by a clamping plate 80 which is secured in position by a knurl-headed screw 81. The tool bit is adjusted after sharpening by adjustment of the seating plate 78 through adjustment of the knurl-headed screw 82. This screw is journaled in the holder 70 and threads into the seating plate 78. Upon adjustment, horseshoe-shaped shims are inserted between the seating plate 78 and the surface 74 of the tool holder in the same manner as in the case of the seating plate 32 of Figs. 1 to 3.

Figure 8:
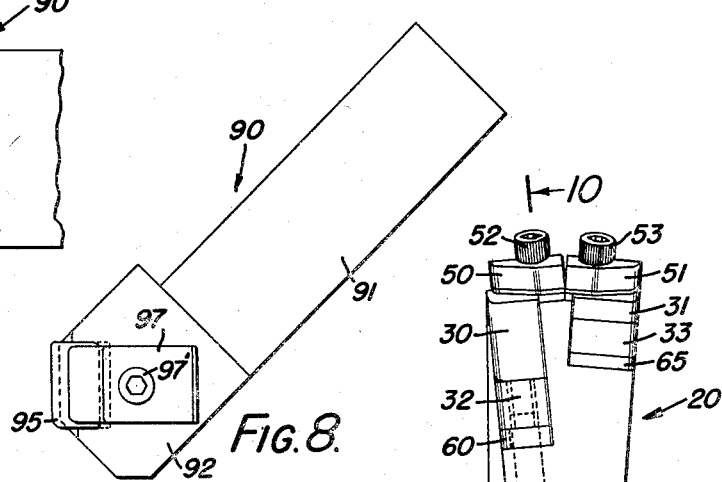
Fig. 8 is a plan view of this tool.

The burring tool shown in Figs. 7 and 8 is generally similar in construction to the flange topping tool of Figs. 4 to 6 inclusive. The tool holder is denoted at 90. It has a shank portion 91 adapted to be mounted in the turret of the lathe and a head 92 on which the tool bit is mounted. The tool bit is denoted at 95. It is secured in the tool head against the seating member 96 by a clamping member 97. The clamping member 97 is secured to the tool holder by a knurl-headed screw 97' that threads into the tool holder. The tool bit 95, as in the previously described embodiments of the invention, is a solid piece of metal. It has a ground plane bottom surface 98 which seats upon the plane ground top face 99 of the seating plate 96. The seating plate itself has a plane bottom face 100 which seats against a plane face 101 ground in the tool holder. The inside surface of the tool bit 95 and the inside surface of the seating plate 96 are plane and are seated against the inside face 103 of the pocket in the tool holder. The rear faces of the bit 95 and seating plate 96 are also plane and seat against the plane rear surface of said pocket. Adjustment of the seating plate 96 and of the tool bit 95 after sharpening is effected by rotation of the knurl-headed screw 102 which is journaled in the tool block and which threads into the seating plate 96. As before, after adjustment, horseshoe shims, such as shown at 60 in Fig. 14, can be inserted between the seating plate 96 and the bottom wall 101 of the pocket in the tool holder to insure firm support of the seating plate 96.

In each embodiment of the invention the tool bit itself is a solid chunk of metal. It has plane seating surfaces which seat against plane surfaces on the seating plate and pocket. The seating plate itself has plane surfaces which seat against plane surfaces on the tool holder, or on a shim which is interposed between the seating plane and tool holder. The shim itself has plane surfaces which seat on the tool holder. The tool holder pockets have inside and rear walls which position the tool bits with proper cutting clearance back of their cutting edges, and which insure that when the tool bits are adjusted after sharpening the new cutting edges will have the proper cutting clearance, and also insure that the tool bit can maintain its original contour throughout its life.

While the invention has been described in connection with several different embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A cutting tool comprising a tool holder having a pocket formed therein which is bounded by an inside wall, a rear wall and a bottom wall that extend at right angles to one another, a solid cutting bit of hard cutting material which is generally prismatic in shape and which has a bottom surface, an inside surface, a top surface, and a rear surface, said inside surface, said rear surface and said bottom surface being plane and extending at right angles to one another, a seating plate that is generally prismatic in shape and that has a top surface, a rear surface, a bottom surface, and an inside surface that are plane and that extend at right angles to one another, the inside surfaces of said cutting bit and of said seating plate seating against the inside surface of said pocket and the rear surface of said cutting bit seating against the rear surface of said pocket, said pocket being open at its outside to expose the top outside edge of said cutting bit, the inside wall of said pocket being inclined inwardly from top to bottom so that cutting clearance is provided back of said top outside edge, a clamping member engaging said tool holder and the top face of said cutting bit, and a headed screw passing through said clamping member and threaded into said tool holder to cause said clamping member to clamp said cutting bit against said seating plate and to clamp said cutting bit and said seating plate in said pocket.

2. A cutting tool comprising a tool holder having a pocket formed therein which has a bottom wall, a rear wall and a side wall that extend at right angles to one another, a solid cutting bit of hard cutting material which is generally prismatic in shape and which has a top face, a rear face, an inside face, and an outside face, and a bottom face, said inside, bottom and rear faces being plane and extending at right angles to one another, said outside face being also plane and extending at right angles to the rear and bottom faces of said bit, a seating plate that is generally prismatic in shape and that has a top face, a rear face, an inside face and a bottom face, all of which are plane, the inside and rear faces of said cutting bit and of said seating plate seating against the side and rear walls, respectively, of said pocket, and the bottom face of said cutting bit seating against the top face of said seating plate, said pocket being open at its outside to expose the top outside edge of said bit, the inside wall of said pocket being inclined inwardly from top to bottom so that cutting clearance will be provided behind said top outside edge, and a shim interposed between said seating plate and the bottom wall of said pocket and supported by said bottom wall, said shim having parallel plane top and bottom faces, a clamping member engaging the top face of said cutting bit, and means for securing said clamping member to said tool holder to clamp said cutting bit, said seating plate, and said shim in said pocket.

3. A cutting tool comprising a tool holder having a pocket formed therein which has a bottom wall, a rear wall and an inside wall that extend at right angles to one another, a solid cutting bit of hard cutting material which is generally prismatic in shape and which has a top face, a rear face, an inside face, an outside face, and a bottom face, said inside, bottom, and rear faces being plane and extending at right angles to one another, and said outside face being also plane and extending at right angles to the rear and bottom faces of said bit, a seating plate that is generally prismatic in shape and that has a top face, a rear face, an inside face and a bottom face, all of which are plane, the inside and rear faces of said cutting bit and of said seating plate seating against the inside and rear walls, respectively, of said pocket, and the bottom face of said cutting bit seating against the top face of said seating plate, and said seating plate being supported by the bottom wall of said pocket, said pocket being open at its outside to expose the top outside edge of said bit, the inside wall of said pocket being inclined inwardly from top to bottom so that cutting clearance will be provided behind said top outside edge of the bit, a clamping member engaging the top face of said cutting bit, and means securing said clamping member to said tool holder to clamp said cutting bit and said seating plate in said pocket, said seating plate having an internally threaded hole, and a screw journaled in said tool holder and threaded into said hole to adjust said seating plate and said cutting bit in a direction perpendicular to the bottom face thereof.

4. A cutting tool comprising a tool holder having a pocket formed therein which has a bottom wall, a rear wall, and an inside wall that extend at right angles to one another, a solid cutting bit of hard cutting material which is generally prismatic in shape and which has a top face, a rear face, an inside face, an outside face, and a bottom face, said inside, bottom, and rear faces being plane and extending at right angles to one another, said outside face being also plane and extending at right angles to the rear and bottom faces of said bit, a seating plate that is generally prismatic in shape and that has a top face, a rear face, an inside face and a bottom face, all of which are plane, the inside and rear faces of said cutting bit and of said seating plate seating against the inside and rear walls, respectively, of said pocket, and the bottom face of said cutting bit seating against the top face of said seating plate, and said seating plate being supported by the bottom wall of said pocket, said pocket being open at its outside to expose the top outside edge of said bit, the inside wall of said pocket being inclined inwardly from top to bottom so that there will be cutting clearance behind said top outside edge, a clamping member engaging the top face of said cutting bit, and means securing said clamping member to said tool holder to clamp said cutting bit and said seating plate in said pocket, said seating plate having an internally threaded hole, a screw journaled in said tool holder and threaded into said hole to adjust said seating plate and said cutting bit in a direction perpendicular to their bottom faces, and a horseshoe-shaped shim interposed between said seating plate and the bottom wall of said pocket and straddling said screw, said shim having parallel plane top and bottom faces.

5. A cutting tool comprising a tool holder having a pocket therein which is open at its outside and at its front and which has a bottom wall, a rear wall, and an inside wall that extend at right angles to one another, a solid cutting bit of hard cutting material which is generally prismatic in shape and which has inside, bottom, and rear faces that are plane and that extend at right angles to one another, and which has an outside face that is also plane and that extends at right angles to its rear and bottom faces, a seating plate that is generally prismatic in shape and that has a top face, a bottom face, a rear face, and an inside face, all of which are plane, the inside and rear faces of said cutting bit and of said seating plate seating against the inside and rear walls, respectively, of said pocket, and the bottom face of said cutting bit seating against the top face of said seating plate, and said seating plate being supported by the bottom wall of said pocket, said cutting bit having a top face which intersects its front and outside faces to form therewith outside and front cutting edges, the rear and inside walls of said pocket being inclined inwardly rearwardly to provide cutting clearance back of said cutting edges a clamping member engaging the top face of said cutting bit, and means securing said clamping member to said tool holder.

6. A cutting tool comprising a tool holder having a pocket therein which is open at its outside and at its front and which has a bottom wall, a rear wall, and an inside wall that extend at right angles to one another, a solid cutting bit of hard cutting material which is generally prismatic in shape and which has inside, bottom, and rear faces that are plane and that extend at right angles to one another, and which has an outside surface that is also plane and that extends at right angles to its rear and bottom faces, a seating plate that is generally prismatic in shape and that has a top face, a bottom face, a rear face, and an inside face, all of which are plane, the inside and rear faces of said cutting bit and of said seating plate seating against the inside and rear walls, respectively, of said pocket, and the bottom face of said cutting bit seating against the top face of said seating plate, and said seating plate being supported by the bottom wall of said pocket, the rear and inside walls of said pocket being inclined to the cutting direction of said tool, a clamping member engaging the top face of said cutting bit, means securing said clamping member to said tool holder, a screw journaled in said tool holder and threading into a hole in said seating plate to adjust said seating plate and said cutting bit in a direction perpendicular to their bottom faces, and a horseshoe-shaped shim interposed between said seating plate and the bottom wall of said pocket and straddling said screw, said shim having parallel top and bottom faces.

7. A cutting tool comprising a tool holder having a top face, a front face, a rear face and two opposite side faces, said side faces converging toward one another rearwardly of said holder, said holder having two pockets formed therein at opposite sides thereof, each pocket having a bottom wall, a rear wall, and an inside wall that extend at right angles to one another, the bottom wall of each pocket also extending at right angles to both the adjacent side face and to the front face of the tool holder, a solid cutting bit positioned in each pocket at the front thereof, and a seating plate positioned in each pocket behind its cutting bit and backing up the associated cutting bit, each cutting bit being generally prismatic in shape and having inside, bottom and rear faces that are plane and that extend at right angles to one another, and each cutting bit having an outside surface that is also plane and that extends at right angles to its rear and bottom faces, each seating plate being generally prismatic in shape and having a bottom face, a rear face, and an inside face, all of which are plane and extend at right angles to one another, and each seating plate having a top face that is also plane and that extends at right angles to its inside face, the bottom face of each cutting bit seating against the top face of the associated seating plate, and each seating plate being supported by the bottom wall of the pocket in which the respective seating plate is positioned, a clamping member engaging the top face of each cutting bit, and means securing each clamping member to said tool holder, and each pocket being open at its outside and at its front to expose the front and outside edges of the cutting bit which is mounted in the respective pocket.

8. A cutting tool comprising a tool holder having a top face, a front face, a rear face and two opposite side faces, said side faces converging toward one another rearwardly of said holder, said holder having two pockets formed therein at opposite sides thereof, each pocket having a bottom wall, a rear wall, and an inside wall that extend at right angles to one another, the bottom wall of each pocket also extending at right angles to both the adjacent side face and to the front face of the tool holder, a solid cutting bit positioned in each pocket at the front thereof, and a seating plate positioned in each pocket behind its cutting bit and backing up the associated cutting bit, each cutting bit being generally prismatic in shape and having inside, bottom and rear faces that are plane and that extend at right angles to one another, and each cutting bit having an outside surface that is also plane and that extends at right angles to its rear and bottom faces, each seating plate being generally prismatic in shape and having a bottom face, a rear face, and an inside face, all of which are plane and extend at right angles to one another, and each seating plate having a top face that is also plane and that extends at right angles to its inside face, the bottom face of each cutting bit seating against the top face of the associated seating plate, and each seating plate being supported by the bottom wall of the pocket in which the respective seating plate is positioned, a clamping member engaging the top face of each cutting bit, each clamping member having engagement at one end with the associate cutting bit and having a fulcrum portion at its opposite end which engages the top face of the tool holder, and a headed screw extending through each clamping member between its ends and threading into said tool holder for effecting clamping of the cutting bit by the associated clamping member, and each pocket being open at its outside and at its front to expose the front and outside edges of the cutting bit which is mounted in the respective pocket.

References Cited in the file of this patent
UNITED STATES PATENTS

| | | |
|---|---|---|
| 1,271,299 | Fish | July 2, 1918 |
| 1,397,357 | Bronander | Nov. 15, 1921 |
| 2,181,023 | Moore | Nov. 21, 1939 |
| 2,414,811 | Hollis | Jan. 28, 1947 |
| 2,577,043 | Steffes | Dec. 4, 1951 |
| 2,628,415 | Brown | Feb. 17, 1953 |